United States Patent
Suzuki et al.

(10) Patent No.: US 8,258,076 B2
(45) Date of Patent: Sep. 4, 2012

(54) PHOSPHORUS COMPOUND ADSORBENT, PHOSPHORUS COMPOUND ADSORPTION SYSTEM, AND METHOD OF USING PHOSPHORUS COMPOUND ADSORBENT

(75) Inventors: Akiko Suzuki, Minato-ku (JP); Tatsuoki Kohno, Minato-ku (JP); Shinetsu Fujieda, Kawasaki (JP); Toshihide Takahashi, Ota-ku (JP); Katsuya Yamamoto, Yokohama (JP); Mari Iwashita, Chuo-ku (JP); Nobuyuki Ashikaga, Kawasaki (JP); Hidetake Shiire, Setagaya-ku (JP); Satoshi Haraguchi, Kodaira (JP); Tokusuke Hayami, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 28 days.

(21) Appl. No.: 12/184,278

(22) Filed: Aug. 1, 2008

(65) Prior Publication Data

US 2009/0048103 A1 Feb. 19, 2009

(30) Foreign Application Priority Data

Aug. 3, 2007 (JP) .............................. P2007-202662
Jul. 24, 2008 (JP) .............................. P2008-190800

(51) Int. Cl.
*B01J 20/22* (2006.01)
*B01J 20/02* (2006.01)
*B01D 15/00* (2006.01)
*B01D 9/02* (2006.01)

(52) U.S. Cl. ........ 502/401; 502/405; 210/660; 210/663; 210/906

(58) Field of Classification Search ................ None
See application file for complete search history.

(56) References Cited

U.S. PATENT DOCUMENTS

2005/0019243 A1 * 1/2005 Katsuro et al. ................ 423/335

FOREIGN PATENT DOCUMENTS

| JP | 57-071697 | | 5/1982 |
| JP | 2001-048791 | | 2/2001 |
| JP | 2004-275839 | | 10/2004 |
| JP | 2005-144420 | | 6/2005 |
| JP | 2005-288366 | A * | 10/2005 |
| JP | 2007-216214 | | 8/2007 |
| WO | WO 2006/088083 | * | 8/2006 |

OTHER PUBLICATIONS

Japanese Office Action for Japanese Application No. 2008-190800 issued on Feb. 3, 2012.
Yokoi, Toshiyuki, et al.; "Fe3+ coordinated to amino-functionalized MCM-41: an adsorbent for the toxic oxyanions with high capacity, resistibility to inhibiting anions, and reusability after a simple treatment", Journal of Colloid and Interface Science, Jun. 15, 2004, vol. 274, Issue 2, pp. 451-457.

* cited by examiner

*Primary Examiner* — Emily Le
*Assistant Examiner* — Sarah A Slifka
(74) *Attorney, Agent, or Firm* — Turocy & Watson, LLP

(57) ABSTRACT

A phosphorus compound adsorbent; a phosphorus compound adsorption system, wherein the phosphorus compound adsorbed can be desorbed in a neutral solvent; and a method of using the phosphorus compound adsorbent are provided. The phosphorus compound adsorbent includes a nitrogen-containing compound having an amino group at an end of the molecular structure, a support carrying the nitrogen-containing compound, and at least one metal ion selected from the group consisting of a zinc ion, a copper ion, an iron ion, and a zirconium ion, which is fixed to the nitrogen-containing compound.

6 Claims, 3 Drawing Sheets

US 8,258,076 B2

PHOSPHORUS COMPOUND ADSORBENT, PHOSPHORUS COMPOUND ADSORPTION SYSTEM, AND METHOD OF USING PHOSPHORUS COMPOUND ADSORBENT

This application is based upon and claims the benefit of priority from the Japanese Patent Application No. 2007-202662, filed on Aug. 3, 2007 and Japanese Patent Application No. 2008-190800, filed on Jul. 24, 2008, the entire contents thereof are incorporated herein by reference.

FIELD OF THE INVENTION

According to the embodiments of the present invention, a phosphorus compound adsorbent, a phosphorus compound adsorption system, and a method of using the phosphorus compound adsorbent are provided.

BACKGROUND OF THE INVENTION

For the purpose of removing phosphorus compounds, e.g., phosphate ions, contained in a wastewater discharged from facilities in the chemical industry, food industry, pharmaceutical industry, fertilizer industry, sewage treatment plants, excreta treatment plants, or the like, the reaction coagulation method is frequently used in which polyvalent ions of a metal such as iron, magnesium, aluminum, or calcium are supplied to the wastewater and reacted with the phosphate ions to thereby convert the phosphate ions into a solid or particles, which is removed by sedimentation, floatation, filtration, etc.

Methods for supplying polyvalent ions of a metal to wastewater include the coagulant addition method in which an aqueous solution of a coagulant such as ferric chloride, poly(ferric sulfate), or poly(aluminum chloride) is supplied with an injection pump (cf. JP-A 2001-48791 (KOKAI)).

Besides such a coagulation method in which a chemical is added, known methods for removing phosphorus compound include the adsorption method in which an ion-exchange resin, hydrotalcite-like clay mineral, zirconium oxide, or the like is used.

SUMMARY OF THE INVENTION

Those adsorbents are subjected to a desorption operation for regeneration and reuse, and a high-concentration basic solvent is generally used in the operation. There is a problem that the high-concentration basic solvent attacks the structure of the adsorbent and this results in deterioration of the structure of the adsorbent.

The invention may provide a phosphorus compound adsorbent which comprises a nitrogen-containing compound having an amino group at an end of the molecular structure thereof, a support carrying the nitrogen-containing compound, and at least one metal ion selected from the group consisting of a zinc ion, a copper ion, an iron ion, and a zirconium ion, which is fixed to the nitrogen-containing compound.

The invention may further provide a phosphorus compound adsorption system, comprising a feeder which feeds a medium containing a phosphorus compound; an adsorption part to adsorb the phosphorus compound of the medium fed, comprising the phosphorous compound adsorbent described above; a discharger which discharges the medium from the adsorption part; a measuring part to determine the content of the phosphorus compound in the medium, the measuring part being disposed on at least one of the feed side and discharge side of the adsorption part; and a controller which controls the amount of the medium to be fed from the feeder to the adsorption part depending on the content of the phosphorus compound in the medium from the measuring part.

The invention may further provide a method of using a phosphorus compound adsorbent which comprises: allowing a phosphorus compound adsorbent described above to adsorb a phosphorus compound; allowing the phosphorus compound adsorbent to desorb the phosphorus compound by pH regulation or by addition of excess salt to regenerate the phosphorus compound adsorbent.

BRIEF DESCRIPTION OF THE DRAWINGS

By way of example and to make the description more clear, reference is made to the accompanying drawing in which.

DETAILED DESCRIPTION OF THE INVENTION

Figure 1A:
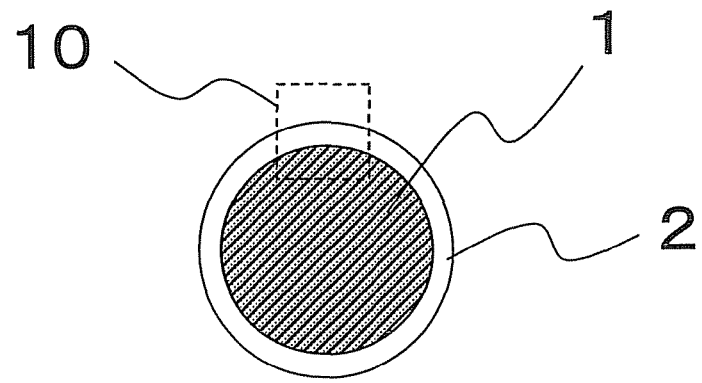
FIG. 1A and FIG. 1B are diagrammatic sectional views for illustrating the structure of one embodiment of the phosphorus compound adsorbent.

Embodiments of the phosphorus compound adsorbent, phosphorus compound adsorption system, and method of using the phosphorus compound adsorbent according to embodiments of the invention are explained below.

Phosphorus Compound Adsorbent:

First, the phosphorus compound adsorbent is explained.

Nitrogen-Containing Compound:

The nitrogen-containing compound having an amino group at an end of the molecular structure thereof means an organic polymer having one or more amino groups at an end of the structure thereof (the compound may be amino groups alone).

Support:

Examples of the support for carrying the nitrogen-containing compound thereon includes silica gel, alumina, glass, kaolin, mica, talc, clay, hydrated alumina, wollastonite, iron powder, potassium titanate, titanium oxide, zinc oxide, silicon carbide, silicon nitride, calcium carbonate, carbon, barium sulfate, boron, ferrite, and the like.

Use of a magnetic substance among those substances, such as, e.g., ferrite, is used as the support enables applications utilizing magnetism. For example, the phosphorus compound adsorbent itself can be magnetically stirred without separately disposing a stirrer, whereby the phosphorus compound adsorbent can be positively brought into contact with a medium to be treated. Thus, the time period of adsorption treatment can be reduced. Furthermore, when the phosphorus compound adsorbent is recovered, it can be easily recovered by means of magnetism. Thus, system simplification, suitability for maintenance, etc. can be achieved.

With respect to the amount of the treatment by the phosphorus compound adsorbent, the amount of phosphorus compounds which can be adsorbed varies depending on the surface area of the adsorbent. In the case where system size reduction is necessary or in similar cases, an adsorbent having a larger adsorption amount per unit volume or unit weight is preferred. Use of a support having a porous structure is hence preferable.

Reagent for Combining with Support:

For enabling the nitrogen-containing compound to be supported on a support, it is necessary to treat the support with a combining reagent having a functional group reactive with a surface hydroxyl group of the support. Examples of the combining reagent having a functional group reactive with a surface hydroxyl group of the support include the following chemical formula 6 to chemical formula 9.

  (chemical formula 6)

$NH_2$—$(CH_2)_n$—$SiR_l(OR)_{3-l}$  (chemical formula 6)

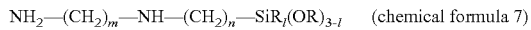  (chemical formula 7)

$NH_2$—$(CH_2)_m$—$NH$—$(CH_2)_n$—$SiR_l(OR)_{3-l}$  (chemical formula 7)

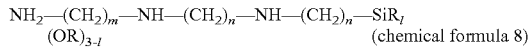  (chemical formula 8)

$NH_2$—$(CH_2)_m$—$NH$—$(CH_2)_n$—$NH$—$(CH_2)_n$—$SiR_l$ $(OR)_{3-l}$  (chemical formula 8)

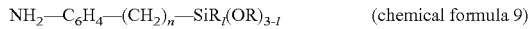  (chemical formula 9)

$NH_2$—$C_6H_4$—$(CH_2)_n$—$SiR_l(OR)_{3-l}$  (chemical formula 9)

In the chemical formulae 6 to 9, each of R's is an alkyl group having 1-3 carbon atoms. Examples thereof include methyl, ethyl, n-propyl, and isopropyl. It is preferred that at least one of chemical formulae 6 to 9 should be used. In this case, the alkyl groups represented by R's may be the same or different. Each of l's represents an integer of 0 to 2, each of m's represents an integer of 1 to 3, and each of n's represents an integer of 0 to 3.

Specific examples of the alkoxysilanes represented by chemical formulas 6 to 9 include N-2-(aminoethyl)-3-aminopropylmethyldimethoxysilane, N-2-(aminoethyl)-3-aminopropyltriethoxysilane, 3-aminopropyltrimethoxysilane, 3-aminopropyltriethoxysilane, and 3-aminopropyldimethylethoxysilane.

Alkoxysilyl Modification:

A series reactions for the so-called alkoxysilyl modification for combining an alkoxysilane with a support can be carried out in the presence of a solvent. The solvent to be used is generally water or ethanol, and may be a mixed solvent. It is also possible to cause the reactions to proceed under water-free conditions by treating the support and an alkoxysilane in dry toluene or dry tetrahydrofuran (dry THF) with refluxing.

Chemical vapor deposition (CVD) may be used to carry out the treatment. For example, an alkoxysilane is dissolved in an appropriate solvent (e.g., toluene), and this solution and a support are placed in an electric furnace of about 100° C., whereby the surface of the support can be modified with the alkoxysilane.

Specifically, a method can be used which includes immersing an untreated support in an alkoxysilane solution (water/ethanol mixed solvent) regulated to have a concentration of 0.1 wt % to 20 wt %, stirring the resultant mixture for from 15 minutes to 3 hours (preferably from 30 minutes to 1 hour), subsequently filtering the mixture, and then washing the support with pure water.

The nitrogen content of the phosphorus compound adsorbent depends on the concentration and amount of the alkoxysilane used for the treatment. The amount of the treatment is calculated from the specific surface area of the support and the minimum coverage of the alkoxysilane using the following expression 1.

$$\text{Amount of treatment with alkoxysilane (g)} = \frac{\left[\begin{array}{c}\text{(weight of support (g))} \times \\ \text{(specific surface area of support (m}^2\text{/g))}\end{array}\right]}{\left[\begin{array}{c}\text{minimum coverage area} \\ \text{with alkoxysilane (m}^2\text{/g)}\end{array}\right]}$$

Expression 1

The alkoxysilanes of different kinds differ in the area that one molecule can cover. When expression 1 is used, it is therefore preferable to employ the minimum coverage area according to the kind of the alkoxysilane used. The alkoxysilane concentration in the treatment for alkoxysilyl modification is preferably 1 wt % to 10 wt %. If the concentration thereof is lower than 1 wt %, the amount of the alkoxysilane per unit area of the support may become too small, resulting in a decrease in the amount of phosphorus compound adsorption per unit area. In case where the concentration thereof is higher than 10 wt %, gelation may occur due to self-condensation of the alkoxysilane.

Finally, the support treated is dried at 50° C. to 150° C. (preferably 80° C. to 120° C.) to thereby obtain a support carrying a nitrogen-containing compound thereon. The drying operation may be carried out in a vacuum atmosphere.

Zinc Ion, Cupper Ion, Iron Ion, Zirconium Ion, and Fixation Thereof:

As a starting material for the metal ion selected from the group consisting of a zinc ion, a copper ion, an iron ion, and a zirconium ion (hereinafter, "metal ion selected from the group consisting of a zinc ion, a copper ion, an iron ion, and a zirconium ion" is referred to as "metal ion"), an inorganic salt, such as chlorides, bromides, sulfates, nitrates, and phosphates, of the metal ion may be used. The counter ions in such inorganic salts are not particularly limited.

Such an inorganic salt is dissolved in an appropriate solvent and the resulting solution is brought into contact with the support carrying a nitrogen-containing compound thereon (hereinafter referred to as "nitrogen-containing compound-carrying support"), whereby metal ions can be fixed to the nitrogen-containing compound. The solvent to be used may be distilled water or ion-exchanged water, and an alcohol solvent such as ethanol or a mixed solvent containing an alcohol solvent may also be used. From the standpoint of suitably exhibiting the effect of the invention, it is preferable to use a solvent having a high affinity for both the nitrogen-containing compound and the inorganic salt.

For preparing a solution containing metal ions, metal ions may be added in a molar amount of equivalent or more per mol of the silane coupling agent used. Specifically, metal ions may be used in at least an equimolar amount with the amount of treatment with alkoxysilane determined with the expression 1 to prepare an aqueous solution thereof having a concentration of 0.1 wt % to 20 wt %. The concentration is more preferably 5 wt % to 10 wt %.

The term "fix" herein means that metal ions are carried by the nitrogen-containing compound carried on the support. In this case, the metal ions may be fixed so that a part or all of the carried metal ions serve as complex ions, and the ions and the nitrogen-containing compound-carrying support as a whole form a complex.

Figure 1B:
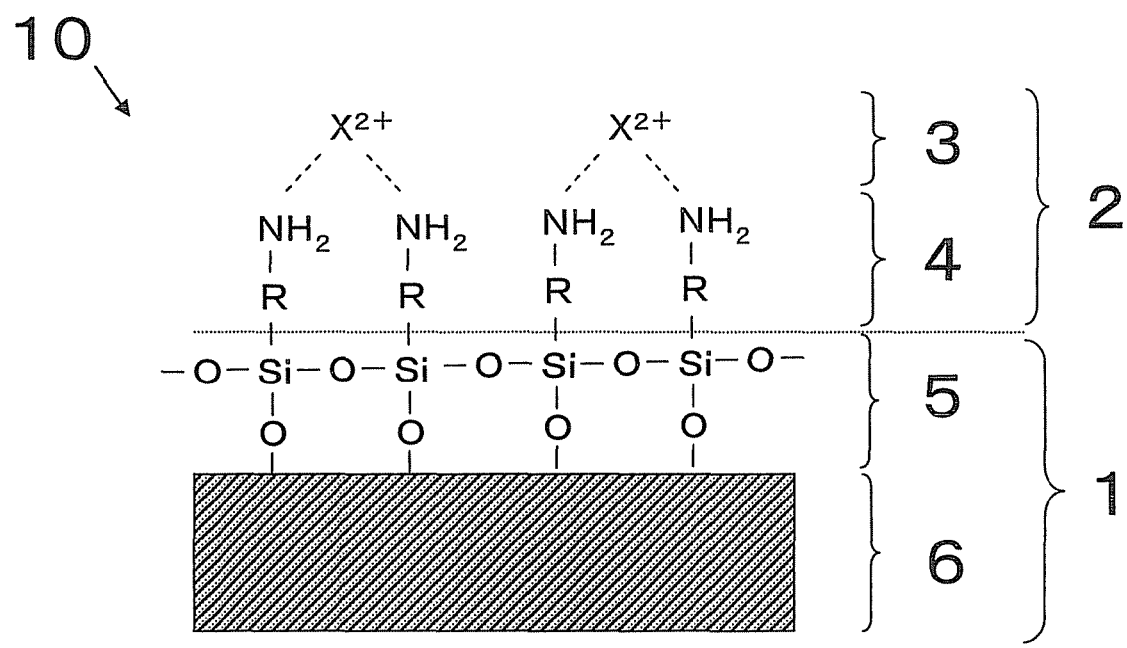
Figure 3:
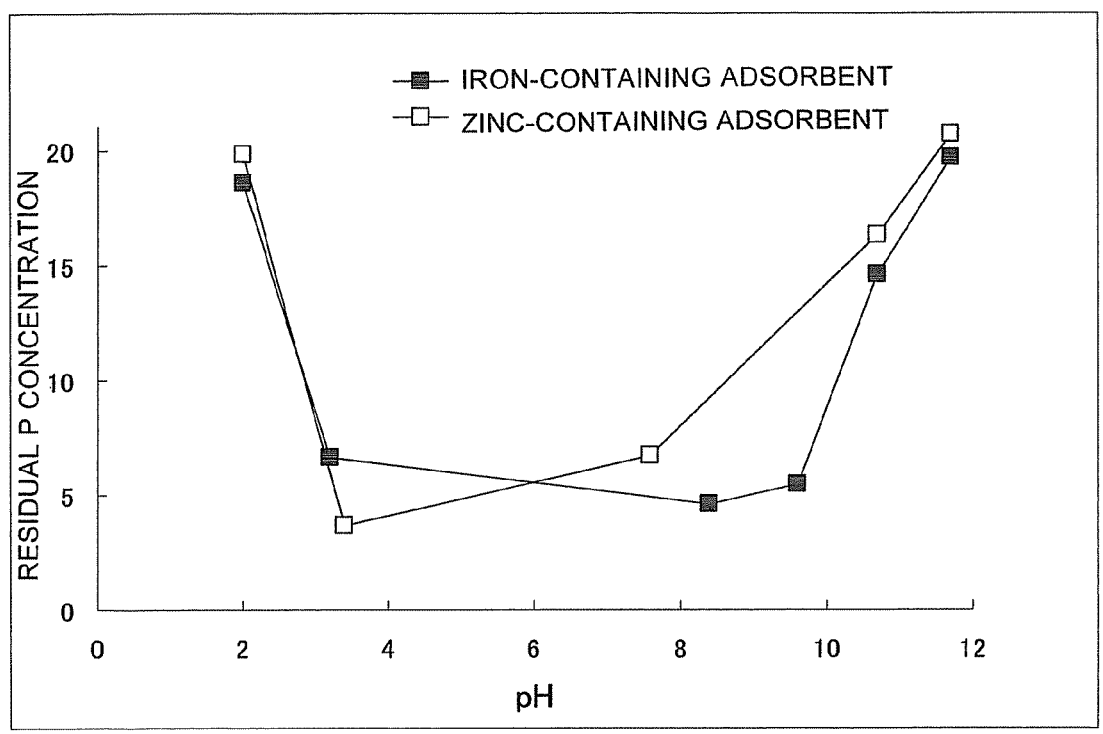
FIG. 3 is a graph showing the relationship between pH for adsorption and the phosphorus compound-adsorbing performance in some embodiments.

Diagrammatic sectional views of a phosphorus compound adsorbent obtained by allowing a nitrogen-containing compound to be carried on a spherical support and further fixing the metal ion according to the production process described above are shown in FIG. 1A and FIG. 1B. In FIG. 1A and FIG. 1B, 10 is an enlarged diagrammatic sectional view of phosphorus compound adsorbent, 1 is a support, and 2 is the surface of the phosphorus compound adsorbent. In FIG. 1B, 3 is a metal ion, 4 is a nitrogen-containing compound, 5 is a silane coupling agent, and 6 is a support base. FIG. 1A is a diagrammatic sectional view for illustrating the structure of the phosphorus compound adsorbent according to one embodiment of the invention, and FIG. 1B is a diagrammatic sectional view which shows an enlargement of part 10 in FIG. 1A in order to illustrate the structure of the phosphorus compound adsorbent according to one embodiment of the invention. $X^{2+}$ in FIG. 1B represents an metal ion.

As the phosphorus compound adsorbent, those satisfying the following expression is preferable:

$$1 \leq (N/M) \leq 20$$

wherein N is the molar amount of nitrogen per 1 g of the phosphorus compound adsorbent and M is the total amount of the zinc ion, the copper ion, the iron ion, and the zirconium ion per 1 g of the phosphorus compound adsorbent. If N/M is lower than 1, metal ions may be discharged. If N/M is higher than 20, excess nitrogen may adsorb other ions. If N/M is within the range of from 1 to 20, the phosphorus compound-adsorbing performance can show a peak within a pH range of from 3 to 10. When N/M satisfies $1 \leq (N/M) \leq 4$, the nitrogen and the metal most efficiently form a complex and the adsorbent has an excellent durability without a fear of discharging metal ions.

When N/M satisfies $5 \leq (N/M) \leq 20$, the amount of amino groups is high. Accordingly, free amino groups can form hydrochloride and can protect the adsorbent from alkaline water, i.e., it is possible to inhibit oxidation of the metal.

Therefore, in accordance with the intended use and conditions, it is possible to respectively exhibit specific effects by choosing the range of $1 \leq (N/M) \leq 4$ or $5 \leq (N/M) \leq 20$. When N/M satisfies $1 \leq (N/M) \leq 4$ and the metal is iron, it is preferable to use water having pH of from 3 to 5 for treatment. When N/M satisfies $1 \leq (N/M) \leq 4$ and the metal is zinc, it is preferable to use water having pH of from 3 to 7 for treatment. When N/M satisfies $5 \leq (N/M) \leq 20$ and the metal is iron, it is preferable to use water having pH of from 5 to 7 for treatment. When N/M satisfies $5 \leq (N/M) \leq 20$ and the metal is zinc, it is preferable to use water having pH of from 5 to 9 for treatment. The preferable pH range depends on the amount of nitrogen in the adsorbent and the stability of the metal ions in the solution.

As the phosphorus compound adsorbent, those satisfying the following expression is preferable:

$$3 \leq (N/Z) \leq 35$$

wherein N is the molar amount of nitrogen per 1 g of the phosphorus compound adsorbent and Z is the molar amount of silicon per 1 g of the phosphorus compound adsorbent. When N/Z is lower than 3, the strength of the support may become weak and the durability may become poor. When N/Z is higher than 35, the adsorption capacity per unit volume reduces. On the other hand, N/Z in the above range can provide higher support strength and can provide appropriate adsorption capacity per unit volume.

Phosphorus Compound:

The phosphorus compound adsorbent thus produced shows satisfactory adsorption performance for the medium to be treated which contains a phosphorus compound. The term "phosphorus compound" herein means any of anions containing the phosphorus element, which may be in an inorganic and/or organic form. For example, phosphoric acid ($H_3PO_4$) may be in any of three ionized states according to conditions, i.e., $H_2PO_4^-$, $HPO_4^{2-}$, and $PO_4^{3-}$. The term "phosphorus compound" is a conception including such anions differing in ionized state.

Phosphorus Compound Adsorption System:

The phosphorus compound adsorption system according to one embodiment of the invention and operation thereof are explained below. Here, an explanation is given first to the constitution and operation of the phosphorus compound adsorption system and later to adsorption onto the phosphorus compound adsorbent and desorption therefrom.

Figure 2:
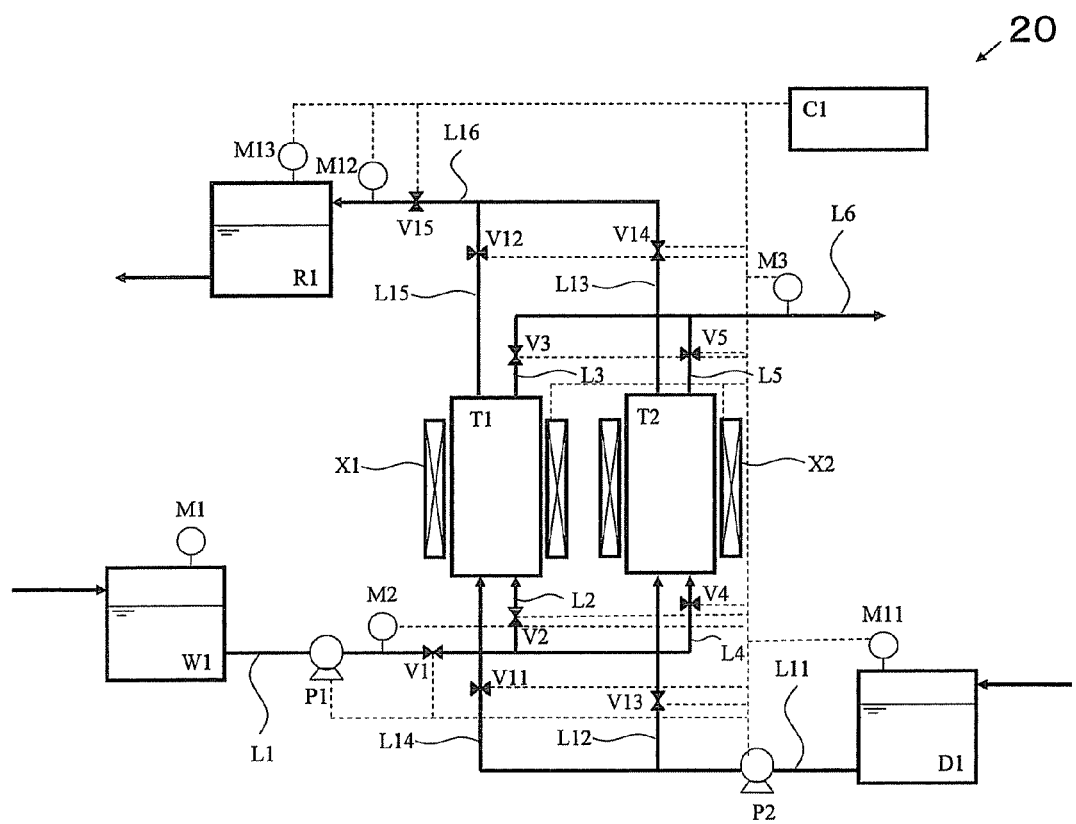
FIG. 2 is a schematic view of one embodiment of the phosphorus compound adsorption system.

Adsorption Part and Feeder:

FIG. 2 is a schematic view of one embodiment of the phosphorus compound adsorption system equipped with adsorption parts in two lines. In FIG. 2, 20 is phosphorus compound adsorption system; T1 and T2 are adsorption parts; P1 is a medium feeder (pump); P2 is a desorption medium feeder (pump); M1, M2, M3, M11, M12, and M13 are measuring parts; C1 is a controller; D1 is a desorption medium feeding tank; R1 is a desorption medium recovering tank; W1 is a medium storage tank; L1, L2, and L4 are medium feed lines; L3, L5, and L6 are treated medium discharge lines; L11, L12, and L14 are desorption medium feed lines; L13, L15, and L16 are desorption medium discharge lines; V1, V2, V3, V4, V5, V11, V12, V13, V14, and V15 are valves; and X1 and X2 are accelerators for contact efficiency.

T1 and T2 are phosphorus compound adsorption parts each packed with a phosphorus compound adsorbent. In the state shown in FIG. 2, adsorption and desorption are being carried out in T1 and T2, respectively.

W1 is a tank in which a medium containing a phosphorus compound is stored. The medium is fed to the adsorption part T2 through feed lines L1 and L2 with a feeder (e.g., a pump P1). The phosphorus compound contained in the medium is adsorbed onto the phosphorus compound adsorbent disposed in the adsorption part T1. The resulting treated medium after adsorption is discharged from the system through discharge lines L3 and L6.

In the case where the medium to be treated contains a considerable amount of suspended solid components (SS components), a remover for removing these components beforehand may be disposed on the upstream side of the adsorption part T1 although not shown in FIG. 2.

Measuring Part and Controller:

The medium is examined with measuring parts (M2 and M3) on the feed side and discharge side of the adsorption part T1 to determine phosphorus compound contents in the medium. Specifically, physical or chemical measuring parts such as, e.g., a concentration meter, flow meter, conductivity meter, and pH meter may be used alone or in combination of two or more thereof. As a matter of course, the measuring parts are not limited to those parts and any other parts may be used as long as measurement of the phosphorus compound content is possible. The embodiment explained below employs a concentration meter as each measuring part. In the case where a concentration meter is employed, values determined from information sent from the measuring part are given as, e.g., voltage values obtained with the concentration meter. Based on this information from the measuring part, the amount of the medium to be fed to the adsorption part T1 with the feeder P1 is regulated by a controller C1.

Specifically, the phosphorus compound adsorption system is controlled in the following manner.

First, when the adsorption part T1 is in an initial state (or in such a state that there is room for adsorption to saturation), the medium is fed from the tank W1 to the adsorption part T1 through the feed lines L1 and L2 with the feeder P1. The phosphorus compound is adsorbed in T1, and the adsorption-treated medium is discharged outside through the discharge lines L3 and L6.

In this operation, the adsorption state of T1 is observed with the measuring part M2 and measuring part M3 disposed on the feed side and the discharge side, respectively. During the period when adsorption proceeds smoothly, the phosphorus compound concentration measured with M3 is lower than that measured with M2. However, as adsorption gradually proceeds and approaches saturation, the phosphorus compound content in the adsorption-treated medium increases gradually. This increase is observed with M3. When the value measured with M3 reaches a predetermined value, the controller C1 regulates the feeder P1 so as to reduce the medium feeding amount or temporarily stop the feeding, based on the information sent from the measuring part M2 and/or M3. When the adsorption is terminated and desorption is carried out, valves V2 and V3 are closed to isolate the adsorption part T1 from the state in which the medium is fed (the isolated state is referred to as state A).

Incidentally, the predetermined value may be set beforehand in the measuring parts M2 and M3 and/or in the controller C1, or may be calculated from a value measured in the beginning of adsorption with M1, M2, or M3 and/or from the adsorption capacity of the adsorption part T1. Alternatively, that value may be determined from these values using, for example, a table prepared beforehand.

The embodiment explained above is one in which the phosphorus compound content of the medium fed fluctuates. However, for example, in the case where the medium to be fed has a known phosphorus compound content, the measuring part M2 may be omitted.

On the other hand, in the case where the medium fluctuates in pH or where the raw medium is strongly acidic or strongly basic and has a pH outside a range suitable for the adsorbent, the following method may be used although not shown in FIG. 2. The pH of the medium is measured with the measuring part M1 and/or M2 to regulate the pH of the medium by means of the controller C1. For example, when a phosphorus compound adsorbent which satisfactorily adsorbs in the pH range of 4 to 9 is employed as one embodiment of the invention and the medium has a pH outside that range, then a pH regulation medium may be added as a pH regulator to, e.g., the tank W1 and mixed with the raw medium to thereby regulate the pH of the medium to a value in the range of 4-9. Thus, the phosphorus compound can be properly adsorbed.

An operation for recovering the phosphorus compound is explained below with respect to the adsorption part T2.

D1 is a tank for storing a desorption medium for desorbing a phosphorus compound which has been adsorbed. The desorption medium is fed from the tank D1 to the adsorption part T2 through feed lines L11 and L12 with a feeder P2. The phosphorus compound adsorbed in the adsorption part T2 is eluted (desorbed) with the desorption medium and discharged outside the adsorption part T2 through discharge lines L13 and L16. The phosphorus compound thus desorbed may be recovered into a recovery tank R1. Alternatively, the phosphorus compound precipitated according to conditions may be recovered through filtration.

In this operation, the desorption state of T2 is observed with a measuring part M11 disposed in the tank D1 and a measuring part M12 disposed on the discharge side. During the period when desorption proceeds smoothly, the phosphorus compound concentration measured with M12 is higher than that measured with M11. However, as the desorption of the phosphorus compound proceeds, the concentration in the desorption-treated liquid decreases gradually. This decrease is observed with M12. When the value measured with M12 reaches a predetermined value, the controller C1 temporarily stops P2 based on the information sent from M11 and M12 and closes valves V13 and V14 to isolate T2 from the desorption medium feed line (this state is referred to as state B).

At the time when both state A and state B are ready, the lines respectively for the two states are switched. Namely, with respect to the adsorption part T1, valves V11 and V12 are opened to initiate desorption. With respect to the adsorption part T2, valves V4 and V5 are opened to initiate adsorption.

For the purpose of heightening the efficacy of contact between the phosphorus compound adsorbent and the medium or desorption medium in adsorption and desorption in the adsorption parts T1 and T2, accelerators X1 and X2 may also be used. Examples of the acceleration include mechanical stirring by a stirrer and non-contact stirring by magnetism. Especially in the case where the support of the phosphorus compound adsorbent is a magnetic substance such as ferrite, this phosphorus compound adsorbent itself can be used as a stirring element without employing a mechanical stirrer. This case is hence effective in size reduction of parts and improvement of the contact efficiency.

The explanation given above is merely for one embodiment, and the phosphorus compound adsorption system of the invention should not be construed as being limited to the embodiment.

Method of Using Phosphorus Compound Adsorbent:

A method of using the phosphorus compound adsorbent according to one embodiment of the invention is explained next.

Adsorption:

First, the mechanism and operation of adsorption are explained.

A medium containing phosphorus compounds, such as, e.g., a domestic sewage from a general home or a livestock sewage, is brought into contact with the phosphorus compound adsorbent explained above as the first embodiment. Examples of simplest methods include one in which the phosphorus compound adsorbent is added to the medium and the resultant mixture is stirred to keep the medium in contact with the phosphorus compound adsorbent while dispersing the phosphorus compounds. In the case where the phosphorus compound adsorbent is particulate, a column (packed column) or the like may be used.

In this operation, the phosphorus compounds contained in the medium (e.g., the phosphate ions and hydrogen phosphate ions described above) are adsorbed onto the surface of the phosphorus compound adsorbent. This adsorption is presumed to occur as a result of the displacement of counter anions of the fixed metal ions by the phosphorus compounds having a higher affinity than the counter anions.

The amount of the phosphorus compound adsorbent to be added to the medium depends on the specific surface area of the nitrogen-containing compound-carrying support. For determining the amount of the adsorbent to be added, a method in which a maximum adsorption amount is determined beforehand through a test and a method in which a maximum adsorption is calculated from an adsorption amount per unit weight and the amount of the phosphorus compound adsorbent added may be employed.

Desorption:

Then, the mechanism and operation of desorption are explained.

After phosphorus compounds have been adsorbed onto the phosphorus compound adsorbent, the phosphorus compounds can be desorbed from the adsorbent and recovered.

As the desorption medium acting on the phosphorus compound adsorbent onto which phosphorus compounds have been adsorbed, for example, an aqueous sodium chloride solution which is a neutral medium may be used. In this case, the phosphorus compounds in the state of being dissolved in the liquid can be recovered. The amount of the desorption medium necessary for the desorption may be 2 times to 10 times the volume of the layer packed with the phosphorus compound adsorbent. However, the aqueous solution may be used in any amount as long as the phosphorus compound adsorbent can be efficiently brought into contact with the aqueous solution. When the amount thereof is smaller than 2 times, there is a possibility that a part of the adsorbent surface might not come into contact with the aqueous solution. In case where the amount thereof is larger than 10 times, the cost of the chemical may increase and tank enlargement may be necessary, resulting in an inefficient operation.

A solvent containing a calcium salt such as calcium chloride or calcium carbonate may be used. By bringing the phosphorus compound adsorbent into contact with such a desorption medium, the phosphorus compounds adsorbed on the phosphorus compound adsorbent are reacted with the calcium. As a result, the phosphorus compounds are precipitated in the form of, e.g., calcium phosphate and can be recovered as a solid. In this case, the concentration of the calcium salt is preferably 0.1 mol/L to 3 mol/L, more preferably 0.5 mol/L to 1.5 mol/L. In case where the concentration thereof is lower than 0.5 mol/L, the precipitation of calcium phosphate may be slow. In case where the concentration thereof is higher than 3 mol/L, this salt concentration is so high that the phosphorus compound adsorbent thus treated may require a washing operation when reused.

It is also possible to employ a method in which the phosphorus compound adsorbent is brought into contact with a basic aqueous solution, such as a sodium hydroxide solution, as a basic solvent to desorb the phosphorus compounds. In this case, the concentration of the sodium hydroxide solution is preferably 0.05 mol/L to 1.5 mol/L, more preferably 0.1 mol/L to 1.0 mol/L. In case where the concentration thereof is lower than 0.05 mol/L, the efficiency of phosphorus compound desorption may be poor. In case where the concentration thereof is higher than 1.5 mol/L, such strong basicity may accelerate deterioration of the phosphorus compound adsorbent.

In the case where a sodium hydroxide solution or an aqueous sodium chloride solution is used, excess sodium hydroxide or excess calcium chloride is added to the aqueous solution containing the eluted phosphorus compounds. As a result, the phosphate ions are precipitated as sodium phosphate or calcium phosphate. By filtering the resultant mixture, the phosphorus compound can be recovered.

As described above, desorption from the phosphorus compound adsorbent can be carried out not only with a basic solvent but also with a neutral solvent. Consequently, the phosphorus compound adsorbent structure can be prevented from deterioration. The term "neutral" herein means to have a pH in the range of 6 to 8 at 25° C.

The invention will be explained below in more detail with reference to Examples.

Example 1

A solution containing 2.1 g of γ-aminopropyltriethoxysilane as a nitrogen-containing compound having an amino group at an end of the molecular structure, 20 mL of ethanol, and 1 mL of water was prepared. Then, 10 g of silica gel (particle diameter, 1.7-4.0 mm; specific surface area, 74 m$^2$/g) was added as a support. This mixture was stirred for 1 hour and then filtered. The silica gel recovered was washed with pure water and then dried at 100° C. to obtain silica gel having the silane coupling agent supported on the surface thereof (nitrogen-containing compound-carrying support).

A 5 g portion of the composition obtained (nitrogen-containing compound-carrying support) was immersed in 20 mL of an aqueous solution containing 2 g of zinc chloride. This mixture was stirred for 1 hour and then filtered. The solid matter separated was washed with pure water and then dried again at 100° C. to obtain a phosphorus compound adsorbent.

The phosphorus compound adsorbent obtained was evaluated for adsorption performance. Specifically, the experimental apparatus shown in FIG. 2 was fabricated to carry out the evaluation. Into the vessel of the adsorption part T1 was introduced 0.5 g of the phosphorus compound adsorbent obtained above. In the medium storage tank W1, an aqueous solution containing 20 mg/L phosphorus element in the form of $Na_2HPO_4$ was prepared as a medium to be subjected to adsorption. Fifty milliliters of this aqueous solution was fed to the adsorption part T1 with the feeder P1. The contents of the adsorption part T1 were stirred with the attached stirrer X1 to bring the phosphorus compound (phosphate anions) into contact with the phosphorus compound adsorbent. The stirring was continued for 20 minutes. Thereafter, the medium thus treated was discharged through the discharge lines L3 and L6 and filtered. The resulting filtrate was examined for residual phosphorus compound concentration with an inductively coupled plasma spectrometer (ICP) to determine the amount of the phosphorus compound adsorbed. The results obtained are shown in Table 1.

TABLE 1

| Example | Amount of adsorbent added (g) | Phosphorus compound concentration in filtrate (mg/L) |
| --- | --- | --- |
| 1 | 0.5 | 18.3 |
| 2 | 0.05 | 4.3 |
| 3 | 0.05 | 4.2 |
| 4 | 0.5 | 15.9 |
| 5 | 0.05 | 6.4 |
| 6 | 0.05 | 12.6 |
| 7 | 0.05 | 12.2 |
| 8 | 0.05 | 7.6 |
| 9 | 0.05 | 12.6 |
| 10 | 0.05 | 16.4 |
| 11 | 0.05 | 3.5 |
| 16 | 0.05 | 7.5 |
| 17 | 0.05 | 10.1 |

Example 2

A solution containing 19 g of γ-aminopropyltriethoxysilane, 20 mL of ethanol, and 1 mL of water was prepared. Then, 10 g of silica gel (particle diameter, 100-210 μm; specific surface area, 600-700 m$^2$/g) was added. A composition (nitrogen-containing compound-carrying support) was obtained by the same treatment as in Example 1. Five grams of this composition was immersed in 20 mL of an aqueous solution containing 9 g of zinc chloride, and this mixture was stirred for 1 hour and then filtered. The solid matter separated was washed with ethanol and then dried again at 100° C. to obtain a phosphorus compound adsorbent.

This phosphorus compound adsorbent was evaluated for adsorption performance in the same manner as in Example 1, except that the adsorbent was used in an amount of 0.05 g. The results obtained are shown in Table 1.

Example 3

A phosphorus compound adsorbent was obtained in the same manner as in Example 2, except that the support was replaced with 10 g of ferrite.

This phosphorus compound adsorbent was evaluated for adsorption performance in the same manner as in Example 1, except that the adsorbent was used in an amount of 0.05 g. The results obtained are shown in Table 1. Since ferrite is a magnetic substance, magnetic stirring was possible. Use of this support was effective also in adsorptive performance.

Example 4

The composition obtained through surface deposition (nitrogen-containing compound-carrying support) shown in Example 1 in an amount of 3.8 g was immersed in 10 mL of an aqueous solution containing 0.5 g of iron chloride. This mixture was stirred for 1 hour and then filtered. The solid matter separated was washed with ethanol and then dried again at 100° C. to obtain a phosphorus compound adsorbent.

This phosphorus compound adsorbent was evaluated for adsorption performance in the same manner as in Example 1. The results obtained are shown in Table 1.

Example 5

The composition obtained through surface deposition (nitrogen-containing compound-carrying support) shown in Example 2 in an amount of 2.4 g was immersed in 10 mL of an aqueous solution containing 1.5 g of iron chloride. This mixture was stirred for 1 hour and then filtered. The solid matter separated was washed with ethanol and then dried again at 100° C. to obtain a phosphorus compound adsorbent.

This phosphorus compound adsorbent was evaluated for adsorption performance in the same manner as in Example 1, except that the adsorbent was used in an amount of 0.05 g. The results obtained are shown in Table 1.

Example 6

Thirty milliliters of dry toluene was refluxed for 2 hours. Then, 2 g of aminopropyldimethylethoxysilane and 2 g of silica gel (particle diameter, 100-210 µm; specific surface area, 600-700 m²/g) which had been dried at 100° C. for 2 hours was added thereto. The resulting mixture was heated with refluxing for 4 hours. Thereafter, the silica gel was taken out by filtration, washed with ethanol, subsequently dried at 100° C. for 12 hours, and then immersed in 10 mL of an aqueous solution containing 1 g of iron chloride. This mixture was dried at 80° C. for 12 hours to obtain a phosphorus compound adsorbent.

This phosphorus compound adsorbent was evaluated for adsorptive performance in the same manner as in Example 1, except that the adsorbent was used in an amount of 0.05 g. The results obtained are shown in Table 1.

Example 7

A solution containing 3.73 g of N-2-(aminoethyl)-3-aminopropylmethyldimethoxysilane, 6 mL of pure water, and 30 mL of ethanol was prepared. Then, 2 g of silica gel (particle diameter, 100-210 µm; specific surface area, 600-700 m²/g) was added thereto.

This mixture was stirred for 1 hour, subsequently filtered, washed with pure water, and then dried at 100° C. in the same manner as in Example 1. Thus, silica gel having the silane coupling agent carried on the surface thereof (nitrogen-containing compound-carrying support) was obtained. This composition obtained through surface deposition (nitrogen-containing compound-carrying support) was immersed in 10 mL of an aqueous solution containing 1 g of iron chloride. This mixture was stirred for 1 hour and then filtered. The solid matter separated was washed with pure water and then dried again at 100° C. to obtain a phosphorus compound adsorbent.

This phosphorus compound adsorbent was evaluated for adsorptive performance in the same manner as in Example 1, except that the adsorbent was used in an amount of 0.05 g. The results obtained are shown in Table 1.

Example 8

A phosphorus compound adsorbent was obtained in the same manner as in Example 6, except that 4.02 g of N-2-(aminoethyl)-3-aminopropyltriethoxysilane was used as an alkoxysilane.

This phosphorus compound adsorbent was evaluated for adsorptive performance in the same manner as in Example 1, except that the adsorbent was used in an amount of 0.05 g. The results obtained are shown in Table 1.

Example 9

Two grams of QuadraPure™ BZA (polystyrene support) (manufactured by Reaxa Ltd.) was immersed in 10 mL of an aqueous solution containing 600 mg of iron(III) chloride. After 1 hour, the mixture was filtered. The solid matter separated was washed with pure water and dried at 70° C. to obtain a phosphorus compound adsorbent.

This phosphorus compound adsorbent was evaluated for adsorptive performance in the same manner as in Example 1, except that the adsorbent was used in an amount of 0.05 g. The results obtained are shown in Table 1.

Example 10

Two grams of QuadraPure™ EDA (polystyrene support) (manufactured by Reaxa Ltd.) was immersed in 10 mL of an aqueous solution containing 600 mg of iron(III) chloride. After 1 hour, the mixture was filtered. The solid matter separated was washed with pure water and dried at 70° C. to obtain a phosphorus compound adsorbent.

This phosphorus compound adsorbent was evaluated for adsorptive performance in the same manner as in Example 1, except that the adsorbent was used in an amount of 0.05 g. The results obtained are shown in Table 1.

Example 11

Two grams of QuadraSil™ TA (silica gel support) (manufactured by Reaxa Ltd.) was immersed in 10 mL of an aqueous solution containing 600 mg of iron(III) chloride. After 1 hour, the mixture was filtered. The solid matter separated was washed with pure water and dried at 70° C. to obtain a phosphorus compound adsorbent.

This phosphorus compound adsorbent was evaluated for adsorptive performance in the same manner as in Example 1, except that the adsorbent was used in an amount of 0.05 g. The results obtained are shown in Table 1.

Example 12

In the vessel of the medium storage tank W1, an aqueous solution containing 20 mg/L P in the form of $Na_2HPO_4$, 20 mg/L $NO_3$ in the form of $NaNO_3$, 20 mg/L $SO_4$ in the form of $Na_2SO_4$, 20 mg/L Cl in the form of NaCl, 20 mg/L $CO_3$ in the form of $Na_2CO_3$, and 20 mg/L Br in the form of KBr was prepared. Into the vessel of the adsorption part T1 was introduced 0.05 g of the phosphorus compound adsorbent obtained in Example 5. Fifty milliliters of the medium was fed to the vessel of the adsorption part T1 with the feeder P1, and the contents of the vessel were stirred with the stirrer X1 to bring the medium into contact with the phosphorus compound adsorbent in the vessel. The contents were stirred with the stirrer X1 for 20 minutes and then filtered. The resultant filtrate was examined for residual phosphorus compound concentration with an ICP.

Furthermore, the concentrations of various kinds of anions remaining in the filtrate were determined by ion chromatography. The results obtained are shown in Table 2. As apparent from the results, the phosphorus compound adsorbent in this Example shows high selectivity for phosphorus compounds. In Table 2, the increase in chlorine is considered to be attributable to the release of chlorine anions which occurred simultaneously with the adsorption because chlorine was the counter anion in the phosphorus compound adsorbent. With respect to $CO_3$, the concentration thereof was not determined because stable determination was impossible.

TABLE 2

| | Composition | | | | |
|---|---|---|---|---|---|
| | P | Cl | $NO_3$ | Br | $SO_4$ |
| Concentration in medium before adsorption (mg/L) | 20 | 25 | 20 | 21 | 22 |
| Concentration in treated medium after adsorption and subsequent filtration (mg/L) | 8 | 120* | 22 | 22 | 18 |

Example 13

An aqueous solution containing 120 mg/L of element P in the form of $Na_2HPO_4$ was introduced into the vessel of the medium storage tank W1. Into the vessel of the adsorption part T1 was introduced 0.5 g of the phosphorus compound adsorbent obtained in Example 5. Fifty milliliters of the raw medium was fed with the feeder P1, and the contents of the vessel were stirred with the stirrer X1 for 20 minutes and then filtered. The solid matter separated was washed with pure water and dried at 70° C. for 2 hours.

Fifty milliliters of 0.1 mol/L sodium hydroxide solution (pH: 11.4) prepared in the desorption medium feed tank D1 was supplied to the vessel of the adsorption part T1 with the desorption medium feeder P2 and added to 150 mg of the phosphorus compound adsorbent obtained above through phosphorus compound adsorption. The contents were stirred for 1 hour. Thereafter, the amount of the phosphorus compound eluted was determined with an ICP. The results obtained are shown in Table 3.

TABLE 3

| Example | Amount of adsorbent added (g) | Phosphorus compound concentration in filtrate (mg/L) |
|---|---|---|
| 13 | — | 26.7 |
| 14 | — | 17.6 |

Example 14

A phosphorus compound adsorbent which had undergone phosphorus compound adsorption was prepared in the same manner as in Example 13. Fifty milliliters of 1 mol/L aqueous sodium chloride solution prepared in the desorption medium feed tank D1 was supplied to the vessel of the adsorption part T1 with the desorption medium feeder P2 and added to 150 mg of the phosphorus compound adsorbent obtained through phosphorus compound adsorption. The contents were stirred with the stirrer X1 for 1 hour. Thereafter, the amount of the phosphorus compound eluted was determined with an ICP. The results obtained are shown in Table 3.

Example 15

A phosphorus compound adsorbent which had undergone phosphorus compound adsorption was prepared in the same manner as in Example 13. Fifty milliliters of 1 mol/L aqueous calcium chloride solution prepared in the desorption medium feed tank D1 was supplied to the vessel of the adsorption part T1 with the desorption medium feeder P2 and added to 300 mg of the phosphorus compound adsorbent obtained through phosphorus compound adsorption. The contents were stirred for 2 hours and then allowed to stand. As a result, a white solid precipitated. The resultant liquid containing the solid was recovered and introduced into the desorption medium recovery tank R1. The solid was analyzed for composition. As a result, the solid was found to be hydroxyapatite.

Example 16

The phosphorus compound adsorbent obtained through phosphorus compound desorption in Example 14 was washed with pure water, recovered by filtration, and then dried at 70° C. for 2 hours. The evaluation of adsorptive performance was conducted in the same manner as in Example 1, except that 0.05 g of the regenerated phosphorus compound adsorbent thus obtained was used. The results obtained are shown in Table 1.

Example 17

The phosphorus compound adsorbent obtained through phosphorus compound desorption in Example 15 was washed with pure water, recovered by filtration, and then dried at 70° C. for 2 hours. The evaluation of adsorptive performance was conducted in the same manner as in Example 1, except that 0.05 g of the regenerated phosphorus compound adsorbent thus obtained was used. The results obtained are shown in Table 1.

Example 18

A solution containing 1.2 g of γ-aminopropyltriethoxysilane as a nitrogen-containing compound having an amino group at an end of the molecular structure, 15 mL of ethanol, and 3 mL of water was prepared. Then, 2 g of silica gel (produced by Nacalai Tesque; particle diameter, 100-200 μm; specific surface area, 600-700 $m^2$/g) was added as a support. This mixture was stirred for 1 hour and then filtered. The silica gel recovered was washed with pure water and then dried at 100° C. to obtain silica gel having the silane coupling agent carried on the surface thereof (nitrogen-containing compound-carrying support).

The composition obtained (nitrogen-containing compound-carrying support) was immersed in 10 mL of an aqueous solution containing 1 g of iron chloride. This mixture was stirred for 1 hour and then filtered. The solid matter separated was washed with ethanol and then dried again at 100° C. to obtain a phosphorus compound adsorbent. As a result of the elemental analysis of the adsorbent, the N/M value was 11.1.

The phosphorus compound adsorbent obtained was evaluated for adsorption performance. Specifically, the experimental apparatus shown in FIG. 2 was fabricated to carried out the evaluation. Into the vessel of the adsorption part T1 was introduced 0.05 g of the phosphorus compound adsorbent obtained above. In the medium storage tank W1, an aqueous solution containing 20 mg/L of element P in the form of $Na_2HPO_4$ was prepared as a medium to be subjected to adsorption. Twenty milliliters of this aqueous solution was fed to the adsorption part T1 with the feeder P1. The contents of the adsorption part T1 were stirred with the attached stirrer X1 to bring the phosphorus compound (phosphate anions) into contact with the phosphorus compound adsorbent. The stirring was continued for 20 minutes. Thereafter, the medium thus treated was discharged through the discharge lines L3 and L6 and filtered. The resulting filtrate was examined for residual phosphorus compound concentration with an inductively coupled plasma spectrometer (ICP) to determine the amount of the phosphorus compound adsorbed. The results obtained are shown in Table 4.

propyltriethoxysilane was replaced with 8 g of γ-aminopropyltriethoxysilane.

A 0.05 g portion of this phosphorus compound adsorbent was evaluated for adsorptive performance in the same manner as in Example 18. The results obtained are shown in Table 4.

Example 22

A phosphorus compound adsorbent was obtained in the same manner as in Example 18, except that 1 g of iron chloride as the metal M was replaced with 1 g of copper chloride.

A 0.05 g portion of this phosphorus compound adsorbent was evaluated for adsorptive performance in the same manner as in Example 18. The results obtained are shown in Table 4.

TABLE 4

| Example/Comparative Example | Coupling agent | Weight of silica gel (g) | Weight of Coupling agent (g) | Metal ion (M) | Nitrogen (wt %) | Metal ion (M) (wt %) | N/M | Residual Phosphorus Compound Concentration mg/L |
|---|---|---|---|---|---|---|---|---|
| Example 18 | 3-aminopropyltriethoxysilane | 2 | 1.2 | Fe | 2.3 | 0.8 | 11.5 | 6.9 |
| Example 19 | 3-aminopropyltriethoxysilane | 2 | 2 | Fe | 2.2 | 1.5 | 5.9 | 4.9 |
| Example 20 | 3-aminopropyltriethoxysilane | 2 | 4 | Fe | 3 | 2.1 | 5.7 | 4.6 |
| Example 21 | 3-aminopropyltriethoxysilane | 2 | 8 | Fe | 2.2 | 2.3 | 3.8 | 3.9 |
| Example 22 | 3-aminopropyltriethoxysilane | 2 | 4 | Cu | 3 | 2.1 | 13.6 | 9.3 |
| Example 23 | 3-aminopropyltriethoxysilane | 2 | 4 | Zr | 3 | 3.6 | 9.3 | 5.6 |
| Example 24 | 3-aminopropyltriethoxysilane | 2 | 2 | Zn | 3.2 | 3.6 | 4.2 | 6.8 |
| Example 25 | N-(2-aminoethyl)-3-aminopropylmethyldimethoxysilane | 2 | 3.7 | Fe | 3.1 | 0.8 | 15.5 | 6.3 |
| Example 26 | N-2-(aminoethyl)-3-aminopropyltrimethoxysilane | 2 | 4 | Fe | 4.2 | 2.1 | 8.0 | 3.7 |
| Example 27 | 3-aminopropyldimethyltrimethoxysilane | 2 | 2 | Fe | 2.1 | 0.3 | 27.9 | 12.6 |
| Example 28 | Q-TA | — | — | Fe | 4.4 | 1.5 | 11.7 | 3.5 |
| Example 29 | Q-TZA | — | — | Fe | 8.6 | 4.2 | 8.2 | 12.6 |
| Example 30 | Q-EDA | — | — | Fe | 9.5 | 9.3 | 4.1 | 15.9 |
| Example 31 | Q-IDA | — | — | Fe | 4.6 | 5.2 | 3.5 | 17.7 |
| Comparative Example 1 | N-phenylaminopropyltrimethoxysilane | 2 | 4.6 | Fe | 0.6 | <0.01 | — | 20.5 |
| Comparative Example 2 | Q-AEA | — | — | Fe | 3.7 | <0.01 | — | 20.5 |

Example 19

A phosphorus compound adsorbent was obtained in the same manner as in Example 18, except that 1.2 g of γ-aminopropyltriethoxysilane was replaced with 2 g of γ-aminopropyltriethoxysilane.

A 0.05 g portion of this phosphorus compound adsorbent was evaluated for adsorptive performance in the same manner as in Example 18. The results obtained are shown in Table 4.

Example 20

A phosphorus compound adsorbent was obtained in the same manner as in Example 18, except that 1.2 g of γ-aminopropyltriethoxysilane was replaced with 4 g of γ-aminopropyltriethoxysilane.

A 0.05 g portion of this phosphorus compound adsorbent was evaluated for adsorptive performance in the same manner as in Example 18. The results obtained are shown in Table 4.

Example 21

A phosphorus compound adsorbent was obtained in the same manner as in Example 18, except that 1.2 g of γ-amino- Example 23

A phosphorus compound adsorbent was obtained in the same manner as in Example 18, except that 1 g of iron chloride as the metal M was replaced with 1 g of zirconium chloride.

A 0.05 g portion of this phosphorus compound adsorbent was evaluated for adsorptive performance in the same manner as in Example 18. The results obtained are shown in Table 4.

Example 24

A phosphorus compound adsorbent was obtained in the same manner as in Example 18, except that 1 g of iron chloride as the metal M was replaced with 1 g of zinc chloride.

A 0.05 g portion of this phosphorus compound adsorbent was evaluated for adsorptive performance in the same manner as in Example 18. The results obtained are shown in Table 4.

Example 25

A phosphorus compound adsorbent was obtained in the same manner as in Example 18, except that 1.2 g of γ-aminopropyltriethoxysilane as the silane coupling agent was replaced with 3.7 g of N-2-(aminoethyl)-3-aminopropylmethyldimethoxysilane.

A 0.05 g portion of this phosphorus compound adsorbent was evaluated for adsorptive performance in the same manner as in Example 18. The results obtained are shown in Table 4.

Example 26

A phosphorus compound adsorbent was obtained in the same manner as in Example 18, except that 1.2 g of γ-aminopropyltriethoxysilane as the silane coupling agent was replaced with 4 g of N-2-(aminoethyl)-3-aminopropyltrimethoxysilane.

A 0.05 g portion of this phosphorus compound adsorbent was evaluated for adsorptive performance in the same manner as in Example 18. The results obtained are shown in Table 4.

Example 27

A phosphorus compound adsorbent was obtained in the same manner as in Example 18, except that 1.2 g of γ-aminopropyltriethoxysilane as the silane coupling agent was replaced with 2 g of 3-aminopropyldimethyltrimethoxysilane.

A 0.05 g portion of this phosphorus compound adsorbent was evaluated for adsorptive performance in the same manner as in Example 18. The results obtained are shown in Table 4.

Example 28

Two grams of QuadraSil™ TA (silica gel support) (manufactured by Reaxa Ltd.) was immersed in 10 mL of an aqueous solution containing 600 mg of iron(III) chloride. After 1 hour, the mixture was filtered. The solid matter separated was washed with pure water and dried at 100° C. to obtain a phosphorus compound adsorbent.

A 0.05 g portion of this phosphorus compound adsorbent was evaluated for adsorptive performance in the same manner as in Example 18. The results obtained are shown in Table 4.

Example 29

A phosphorus compound adsorbent was obtained in the same manner as in Example 28, except that 2 g of QuadraSil™ TA (silica gel support) (manufactured by Reaxa Ltd.) was replaced with 2 g of QuadraPure™ BZA (polystyrene support) (manufactured by Reaxa Ltd.).

A 0.05 g portion of this phosphorus compound adsorbent was evaluated for adsorptive performance in the same manner as in Example 18. The results obtained are shown in Table 4.

Example 30

A phosphorus compound adsorbent was obtained in the same manner as in Example 28, except that 2 g of QuadraSil™ TA (silica gel support) (manufactured by Reaxa Ltd.) was replaced with 2 g of QuadraPure™ EDA (polystyrene support) (manufactured by Reaxa Ltd.).

A 0.05 g portion of this phosphorus compound adsorbent was evaluated for adsorptive performance in the same manner as in Example 18. The results obtained are shown in Table 4.

Example 31

A phosphorus compound adsorbent was obtained in the same manner as in Example 28, except that 2 g of QuadraSil™ TA (silica gel support) (manufactured by Reaxa Ltd.) was replaced with 2 g of QuadraPure™ IDA (polystyrene support) (manufactured by Reaxa Ltd.).

A 0.05 g portion of this phosphorus compound adsorbent was evaluated for adsorptive performance in the same manner as in Example 18. The results obtained are shown in Table 4.

Comparative Example 1

A phosphorus compound adsorbent was obtained in the same manner as in Example 18, except that 1.2 g of γ-aminopropyltriethoxysilane as the silane coupling agent was replaced with 4.6 g of N-phenylaminopropyltrimethoxysilane.

A 0.05 g portion of this phosphorus compound adsorbent was evaluated for adsorptive performance in the same manner as in Example 18. The results obtained are shown in Table 4.

Comparative Example 2

A phosphorus compound adsorbent was obtained in the same manner as in Example 28, except that 2 g of QuadraSil™ TA (silica gel support) (manufactured by Reaxa Ltd.) was replaced with 2 g of QuadraPure™ AEA (polystyrene support) (manufactured by Reaxa Ltd.).

A 0.05 g portion of this phosphorus compound adsorbent was evaluated for adsorptive performance in the same manner as in Example 18. The results obtained are shown in Table 4.

Example 32

The pH dependency of the phosphorus compound adsorbents obtained in Example 19 and Example 24 were evaluated as follows. That is, an aqueous solution containing 20 mg/L of P was prepared by adding $Na_2HPO_4$ to an aqueous solution of which pH had been adjusted with hydrochloric acid and a sodium hydroxide solution and pH was confirmed by using a pH meter. The evaluation of the adsorptive performance at the given pH was carried out in the same manner as in Example 18. The result is shown in FIG. 3. As shown in FIG. 3, it was confirmed that the adsorbents obtained in Examples 19 and 24 showed high adsorptive performance for the phosphorus compound at a pH range of from 3 to 10 and that they have stable adsorptive performance especially at the pH range of from 3 to 8. In the pH range of from 3 to 8, oxidation of the metal was inhibited and the phosphorus compound can be adsorbed stably without forming hydroxides. In addition, because the silicon-oxygen bond is stable at this pH range, the durability of the adsorbents are excellent.

While the invention has been described in detail and with reference to specific embodiments thereof, it will be apparent to one skilled in the art that various changes and modifications can be made therein without departing from the scope thereof.

What is claimed is:

1. A phosphorus compound adsorbent which comprises
a nitrogen-containing compound having an amino group at an end of the molecular structure thereof,
a support carrying the nitrogen-containing compound, and
at least one metal ion selected from the group consisting of a zinc ion, and a copper ion, which is linked to the nitrogen-containing compound,
wherein the nitrogen-containing compound has at least one structure selected from the following chemical formulas 1 to 4:

$(CH_9)_n NH_2$ (chemical formula 1)

$(CH_2)_n NH(CH_2)_m NH_2$ (chemical formula 2)

$(CH_2)_nNH(CH_2)_m(CH_2)_mNH_2$ (chemical formula 3)

$NH(CH_2)_mNH_2$ (chemical formula 4)

wherein each of n's independently represents an integer of from 0 to 3 and each of m's independently represents an integer of from 1 to 3.

2. The adsorbent according to claim 1, which satisfies the following expression:

$$1 \leq (N/M) \leq 20$$

wherein N is the molar amount of nitrogen per 1 g of the phosphorus compound adsorbent and M is the total amount of the zinc ion and the copper ion per 1 g of the phosphorous compound adsorbent.

3. The adsorbent according to claim 2, wherein the support comprises a silica gel and a silane coupling agent.

4. The adsorbent according to claim 1, wherein the support comprises a silica gel and a silane coupling agent.

5. A phosphorus compound adsorption system, comprising:
   a feeder which feeds a medium containing a phosphorus compound;
   an adsorption part to adsorb the phosphorus compound of the medium fed, comprising the phosphorus compound adsorbent according to claim 1;
   a discharger which discharges the medium from the adsorption part;
   a measuring part to determine the content of the phosphorus compound in the medium, the measuring part being disposed on at least one of the feed side and discharge side of the adsorption part; and
   a controller which controls the amount of the medium to be fed from the feeder to the adsorption part depending on the content of the phosphorus compound in the medium from the measuring part.

6. A method of using a phosphorus compound adsorbent which comprises:
   allowing a phosphorus compound adsorbent to adsorb a phosphorus compound, said phosphorus compound adsorbent comprising a nitrogen-containing compound having an amino group at an end of the molecular structure thereof, a support carrying the nitrogen-containing compound, and at least one metal ion selected from the group consisting of a zinc ion, and a copper ion, which is linked to the nitrogen-containing compound; and
   allowing the phosphorus compound adsorbent to desorb the phosphorus compound by pH regulation or by addition of excess salt to regenerate the phosphorus compound adsorbent.

* * * * *